Figure 1:
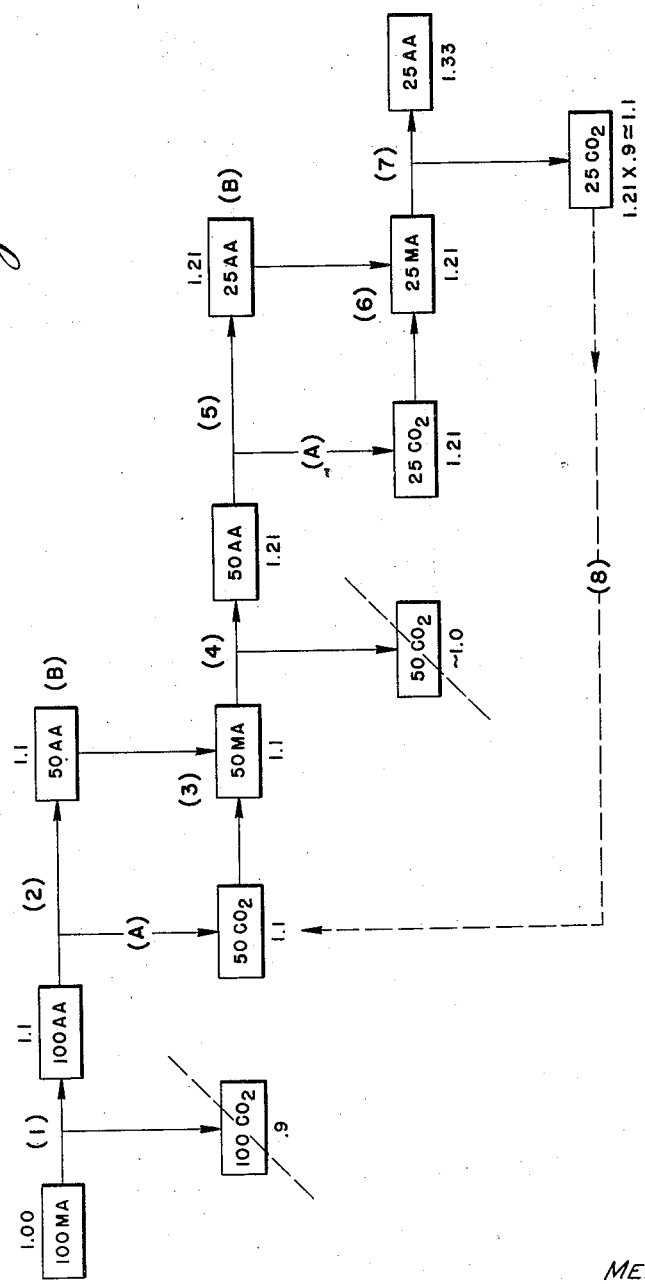

Patented June 13, 1950

2,511,667

UNITED STATES PATENT OFFICE 2,511,667

CHEMICAL METHOD FOR CONCENTRATING ISOTOPES OF CARBON

Melvin Calvin and Peter E. Yankwich, Berkeley, Calif., assignors to the United States of America as represented by the United States Atomic Energy Commission Application August 13, 1948, Serial No. 44,016

3 Claims. (Cl. 260—541)

This invention relates to a new chemical method for the concentration of the isotopes of carbon. More particularly it relates to a method for the concentration of $C^{13}$ and $C^{14}$ by means of repeated decomposition and synthesis of certain organic compounds in which the functional groups are symmetrical.

Recently there has developed a great need for large amounts of isotopes of various chemical elements, especially those with radioactive properties. These isotopes are of tremendous value to researchers in the fields of tracer chemistry and medicine. Particularly in the work of the organic chemist is the usefulness of radioactive isotopes of unquestionable scientific importance. Reactions may be studied in detail and structures which were heretofore uncertain can now be positively established by means of these isotopes.

Since the work done with isotopes at the present time is largely in the field of organic chemistry, it is to be expected that large concentrations of the isotopes of carbon would be in demand throughout the entire chemical world. It is with the isotopes of carbon that the present invention is concerned and clearly represents an advance over the earlier methods of isotope concentration.

In the past various methods for the concentration of isotopes have been devised. The first of these was the mass-spectroscopic method which, when dealing with minute quantities, completely separated the isotopes from each other. Methods of enrichment followed and these included separation by various forms of diffusion. Porous wall diffusion, gravitational diffusion, and thermal diffusion have been used successfully. Multiple stage diffusion processes followed and these were found to be of value for particular elements. Other methods for enrichment include electro-chemical means, fractional distillation, and chemical exchange reactions. These methods are all valuable and find manifold applications in the production of isotopes at the present time.

The chemical exchange reaction method for enrichment depends on the slight change in the equilibrium constant during a reaction involving one of the elements in isotopic form. This change in the equilibrium constant follows from the fact that there are differences in the reactivities of isotopic molecules; these differences being mainly attributed to the residual or zero point energy. Catalysts have been developed for particular processes of enrichment and satisfactory results have been obtained particularly with certain specific reactions.

The present invention also makes use of a physical chemical property of isotopes of chemical elements but the differences between the two methods will be readily apparent from an examination of the description and claims.

It is therefore an object of the present invention to provide a useful, practical chemical method for the concentration of the isotopes of carbon.

It is a further object of the present invention to provide a new and revolutionary chemical method for the concentration of the isotopes of carbon.

It is a still further object of the present invention to provide a new chemical method for the concentration of the isotopes of carbon which will be readily adaptable to commercial production and which will be of marked significance as a forward step in the great need for these particular isotopes in the fields of tracer chemistry and medicine.

Other objects and advantages will be apparent in the following description and the accompanying drawing, in which:

Figure 1 is a flow sheet diagram of a particular experimental run illustrating the necessary steps to obtain the desired enrichment by the method herein described and is the sole figure thereof.

This invention makes use of a law of physical chemistry which establishes that there is a difference between the bond strengths of a $C^{12}-C^{12}$ linkage and a $C^{12}-C^X$ linkage, where X represents an atomic weight corresponding to that of an isotope of carbon other than 12.

In order for the present invention to be operable it is necessary to start with an organic material in which the functional groups are symmetrical. Two compounds of this type are malonic acid and phthalic acid. Any or all of the symmetrical functional groups in these compounds may be labeled with isotopic carbon; that is, detectable amounts of any one of the isotopes of carbon may allowably be present in one or all of the functional groups.

Since there is a difference in the bond strengths as hereinbefore discussed, the partial decarboxylation of malonic acid to acetic acid (or of phthalic acid to benzoic acid) proceeds in two possible paths:

COOHCH$_2$C*OOH = either: (a) CH$_3$C*OOH + CO$_2$
or: (b) CH$_3$COOH + C*O$_2$

The labeled C is indicated by C*.

In the case where C* is labeled with $C^{14}$, path (a) is the favored possibility because the $C^{12}-C^{14}$ bond is stronger than the $C^{12}-C^{12}$ bond. Experimental values indicate, in the case of the partial (partial in this instance relates to the completion of the process $X_1RX_2 \rightarrow X_1 + RX_2$ where $X_1$ and $X_2$ are chemically identical atoms or groups, i. e., COOH) decarboxylation of malonic acid labeled with $C^{14}$, that the most conservative value for $a/b = 1.12 \pm 0.03$. The factor $a/b$ is the ratio of the frequencies with which each path is taken during the process of partial decarboxylation.

Since this relationship exists, the amount of isotopic (isotopic: an isotope in such relative amount that it serves as a label, i. e., present in a concentration other than that ordinarily found in "natural" or "normal" carbon) carbon can be concentrated and the normal $C^{12}$ portions discarded by means of repeated partial decomposition and selected synthesis. This process of partial decomposition and selected synthesis is continued until the point at which the $CO_2$ becomes enriched to such a degree that it may be fed back into the process at an earlier step in lieu of being discarded. This will become more apparent after a consideration of the following example and Figure 1. The example is described in progressive steps, each number and letter corresponding with a particular phase of the process as illustrated in Fig. 1. Example: Start with $CH_2(C*OOH)_2$ labeled with 1% $C^{14}$. The method and resulting concentrations are as follows:

(1) 100 moles of malonic acid with 1.0% $C^{14}$ decomposes into 100 moles of acetic acid with 1.1% $C^{14}$ and into 100 moles of $CO_2$ with 0.9% $C^{14}$. This particular 100 moles of $CO_2$ is withdrawn from the process and may be reserved as future starting material.

(2) The 100 moles of acetic acid (1.1% $C^{14}$) formed in step (1) above is divided into two portions (A) and (B) of 50 moles each. From portion (A) is formed, by decarboxylation, 50 moles of $CO_2$ with 1.1% $C^{14}$. Portion (B) is retained as such.

(3) Portion (B) of step (2) is combined with the 50 moles of $CO_2$ formed from portion (A) of step (2) to form 50 moles of malonic acid with 1.1% $C^{14}$.

(4) Step (1) is substantially repeated with the 50 moles of malonic acid formed in step (3), as follows: 50 moles of malonic acid with 1.1% $C^{14}$ decomposes into 50 moles of acetic acid with 1.21% $C^{14}$ and into 50 moles of $CO_2$ with approximately 1% $C^{14}$. This $CO_2$ is also withdrawn from the process and may be reserved as future starting material.

(5) Step (2) is substantially repeated with the 50 moles of acetic acid (1.21% $C^{14}$) formed in step (4), as follows: the 50 moles of acetic acid is divided into two portions (A) and (B) of 25 moles each. From portion (A) is formed 25 moles of $CO_2$ with 1.21% $C^{14}$. Portion (B) is retained as such.

(6) Step (3) is substantially repeated as follows: portion (B) of step (5) is combined with the 25 moles of $CO_2$ formed from portion (A) of step (5) to form 25 moles of malonic acid with 1.21% $C^{14}$.

(7) Step (1) is substantially repeated with the 25 moles of malonic acid formed in step (6), as follows: 25 moles of malonic acid with 1.21% $C^{14}$ decomposes into 25 moles of acetic acid with 1.33% $C^{14}$ and into 25 moles of $CO_2$ with approximately 1.1% $C^{14}$.

(8) The $CO_2$ with approximately 1.1% $C^{14}$ is fed back as a substitute for part of the $CO_2$ from part (A) of step (2) in either a continuous process or in a later repetition of the original process. This feeding back into either a continuous or later repeated process has the very desirable effect of eliminating the necessity of splitting the 100 moles of acetic acid, resulting from step (1), into equal parts, (A) and (B). Instead, part (B) of step (2) can thereby be increased because the amount of $CO_2$ to be produced from part (A) of step (2), which is to be used in the synthesis of malonic acid in step (3), can now be substantially reduced; a portion of the required $CO_2$ being replaced by the enriched $CO_2$ formed from step (7).

The steps of decomposing and synthesizing recited in the above process may be repeated still further than indicated in Fig. 1, whereby a greater degree of enrichment of the specific carbon isotope is obtained.

It is to be noted from the foregoing that the process outlined above is adaptable to a continuous process for commercial production of carbon compound enriched with a particular isotope of carbon.

While the salient features of this invention have been described in detail with respect to one embodiment, it will of course be apparent that numerous modifications may be made within the spirit and scope of this invention, and it is not therefore desired to limit the invention to the exact details shown except insofar as they may be defined in the following claims.

What is claimed is:

1. In a chemical method for concentrating an isotope of carbon, the steps comprising partially decarboxylating an organic compound selected from the group consisting of phthalic acid and malonic acid in which at least one of the functional groups is labeled with isotopic carbon to form a product enriched with said isotope, reforming said organic compound employing said enriched product as the source of the synthesizing material, and repeating said steps to effect the desired degree of isotopic enrichment.

2. In a process for concentrating an isotope of carbon, the steps comprising decarboxylating a compound selected from the group consisting of phthalic and malonic acids with a labeled functional group to form a monocarboxylic acid, decarboxylating a portion of said monocarboxylic acid to yield labeled carbon dioxide, reforming said compound in an enriched form using a second portion of said monocarboxylic acid and said carbon dioxide, and repeating said steps to effect the desired degree of isotope enrichment.

3. In a multistage process for concentrating an isotope of carbon, the steps comprising decarboxylating a compound selected from the group consisting of phthalic and malonic acids having a labeled functional group to form a monocarboxylic acid and a portion of carbon dioxide, decarboxylating a portion of said monocarboxylic acid to yield another portion of carbon dioxide, reforming said compound using a second portion of said monocarboxylic acid and said other portion of carbon dioxide, and performing said steps in cyclic sequences with the reintroduction of said portions of carbon dioxide to effect a further enrichment of said isotope.

MELVIN CALVIN.
PETER E. YANKWICH.

No references cited.